US009456316B2

United States Patent
Ishiyama et al.

(10) Patent No.: US 9,456,316 B2
(45) Date of Patent: Sep. 27, 2016

(54) COMMUNICATION APPARATUS AND COMMUNICATION METHOD

(71) Applicant: Kabushiki Kaisha Toshiba, Minato-ku (JP)

(72) Inventors: Masahiro Ishiyama, Kawasaki (JP); Arata Miyamoto, Kita (JP); Kenichi Maeda, Kamakura (JP); Hiroki Kudo, Kawasaki (JP); Hiroto Nakai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 37 days.

(21) Appl. No.: 14/483,581

(22) Filed: Sep. 11, 2014

(65) Prior Publication Data

US 2015/0296349 A1    Oct. 15, 2015

Related U.S. Application Data

(60) Provisional application No. 61/977,842, filed on Apr. 10, 2014.

(51) Int. Cl.
*H04H 20/71* (2008.01)
*H04W 4/06* (2009.01)
*H04L 29/08* (2006.01)
*H04L 12/741* (2013.01)

(52) U.S. Cl.
CPC .............. *H04W 4/06* (2013.01); *H04L 45/745* (2013.01); *H04L 67/104* (2013.01)

(58) Field of Classification Search
None
See application file for complete search history.

(56) References Cited

U.S. PATENT DOCUMENTS

| 8,165,130 | B2 | 4/2012 | Alfano et al. | |
|---|---|---|---|---|
| 2006/0136603 | A1* | 6/2006 | Morvan | H04B 7/2687 709/248 |
| 2007/0140173 | A1* | 6/2007 | Tomizu | H04W 36/36 370/331 |
| 2007/0147347 | A1 | 6/2007 | Ristock | |
| 2009/0041045 | A1* | 2/2009 | Yang | H04W 72/005 370/401 |
| 2012/0093052 | A1* | 4/2012 | Kang | H04W 4/005 370/311 |
| 2012/0099572 | A1* | 4/2012 | Kato | H04W 88/06 370/338 |
| 2014/0050178 | A1* | 2/2014 | Asai | H04W 8/186 370/329 |

FOREIGN PATENT DOCUMENTS

| JP | 2009-521747 | 6/2009 |
|---|---|---|
| JP | 4607764 B2 | 1/2011 |
| JP | 4954328 B2 | 6/2012 |
| WO | WO 2005/041534 A1 | 5/2005 |

* cited by examiner

*Primary Examiner* — Gregory Sefcheck
*Assistant Examiner* — Jael Ulysse
(74) *Attorney, Agent, or Firm* — Oblon, McClelland, Maier & Neustadt, L.L.P.

(57) ABSTRACT

A mode of a publisher or a subscriber is stored. Also, a first identifier indicating affiliation to a first group is stored. In a case of the publisher, a transmission message including ToC information, which is a list of the first identifiers and data to be transmitted, is transmitted to an outside. In a case of the subscriber, when a received message includes the first identifier, data included in the message is stored into a non-volatile memory, and when it is determined that all data in the ToC information stored in the received message are already received and that the number of publishers is less than a threshold, the stored mode is changed to the publisher.

13 Claims, 8 Drawing Sheets

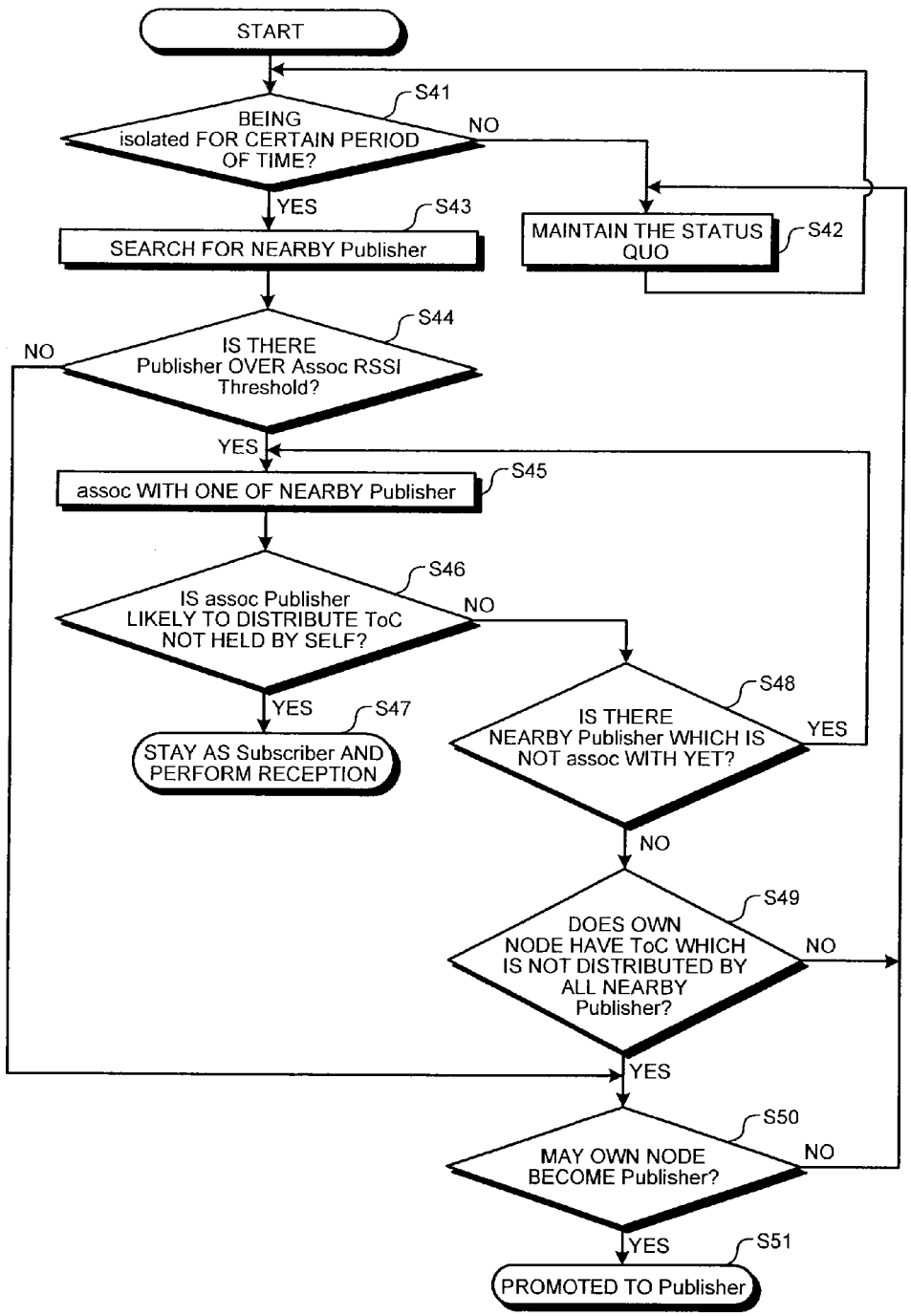

COMMUNICATION APPARATUS AND COMMUNICATION METHOD

CROSS-REFERENCE TO RELATED APPLICATIONS

This application is based upon and claims the benefit of priority from U.S. Provisional Application No. 61/977,842, filed on Apr. 10, 2014; the entire contents of which are incorporated herein by reference.

FIELD

Embodiments relate to a communication apparatus and a communication method.

BACKGROUND

In wireless communication, there is a case where a transmission terminal transmits the same data to a plurality of receiving terminals. The transmission terminal holds a list of data, which can be transmitted to a receiving terminal, as a Table of Contents (ToC) and notifies the ToC.

BRIEF DESCRIPTION OF THE DRAWINGS

FIG. 10 is a flowchart illustrating an example of a processing step of an Isolated subscriber.

DETAILED DESCRIPTION

A communication apparatus of the present embodiment stores whether a mode thereof is a mode to operate as a publisher or a mode to operate as a subscriber, and also stores a first identifier indicating affiliation to a first group. When being a publisher, the communication apparatus outputs a transmission message including ToC information, which is a list of the first identifiers and data to be transmitted, to outside of the communication apparatus. When being a subscriber, the communication apparatus determines whether a received message includes the first identifier, and stores data included in the message into a non-volatile memory when the first identifier is included. When it is determined that all data corresponding to the ToC information stored in the received message are already received and that the number of apparatuses operating as publishers in the outside of the communication apparatus is less than a threshold, the communication apparatus changes the stored mode to the publisher.

In the following, a communication apparatus and a communication method according to an embodiment will be described in detail with reference to the attached drawings. Note that the embodiment is not intended to limit the present invention.

Embodiment

Figure 1:
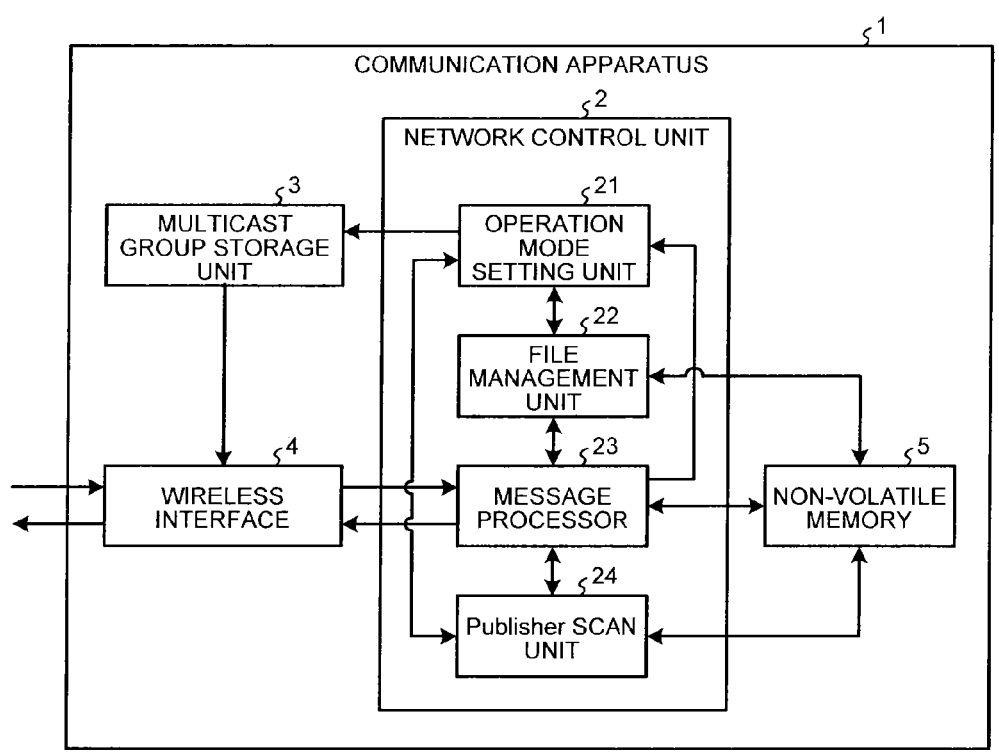
FIG. 1 is a block diagram illustrating a configuration example of a communication apparatus according to an embodiment.

FIG. 1 is a block diagram illustrating a configuration example of a communication apparatus 1 according to an embodiment. The communication apparatus 1 includes a network control unit 2, a multicast group storage unit 3 (identification information storage unit), a wireless interface 4, and a non-volatile memory 5.

The communication apparatus 1 of the embodiment can transmit/receive data to/from different communication apparatus of a similar configuration of the communication apparatus 1 by peer-to-peer (P2P) type communication. The communication apparatus 1 can perform unicast communication with the different communication apparatus, and can transmit the same data to a plurality of the different communication apparatuses 1 by multicast.

The wireless interface 4 performs processing for receiving a wireless signal. When the received signal is a message to the communication apparatus 1, the wireless interface 4 outputs the message to the network control unit 2. Also, the wireless interface 4 transmits a message generated by the network control unit 2 as a wireless signal. Moreover, the wireless interface 4 performs forward processing for realizing the P2P type communication by a plurality of communication apparatuses 1. There is no restriction in a protocol or the like to realize the P2P communication, but an Internet Protocol (IP) can be used, for example.

The multicast group storage unit 3 holds a list of identifiers of a multicast group to which the communication apparatus 1 belongs. The multicast group storage unit 3 notifies, to the wireless interface 4, the identifier of the multicast group to which the communication apparatus 1 belongs. The wireless interface 4 determines that a destination of a message, in which a multicast address corresponding to the identifier of the multicast group to which the communication apparatus 1 belongs is stored as a destination, is also the communication apparatus 1. The non-volatile memory 5 holds data to be transmitted, received data, and the like. The network control unit 2 includes an operation mode setting unit 21, a file management unit 22, a message processor 23, and a Publisher scan unit 24.

In an exchange of data between mobile devices, there may be a case where it is necessary to transmit the same data to a plurality of terminals. In this case, data transfer of one-to-many occurs. When communication efficiency is not considered, it is considered to repeat one-to-one communication for the number of receiving terminals. However, it is redundant to transmit the same data repeatedly. Time necessary for forwarding increases and a frequency band is occupied for a long period of time unnecessarily.

To avoid such a situation, one-to-many multicast communication is used instead of one-to-one unicast communication. In the present embodiment, when the same data is transmitted to a plurality of the different communication apparatuses 1, transmission/reception of data is managed by using a multicast group. The multicast group is a set of communication apparatuses 1 which belong to the same logical network and are in a relationship to transmit/receive data to/from each other. In the present embodiment, the logical network includes a plurality of communication apparatuses which includes an identifier of the same multicast. That is, between the communication apparatuses having the identifier of the same multicast, transmission/reception of data delivered in the multicast group is performed. Between communication apparatuses which do not have an identifier of the same multicast, transmission/reception of data delivered in the multicast group is not performed, even when the communication apparatuses are within a physically short distance. In the present embodiment, when the same data is transmitted to a plurality of the different communication apparatuses 1, a communication apparatus 1 to be a transmission source of data, that is, a transmission source apparatus, is called a publisher (transmission source), and a communication apparatus 1 other than the publisher is called a subscriber (receiving side). The subscriber receives data directly from the publisher or through different communication apparatus 1. In each multicast group, one or more communication apparatuses 1 to be the publishers are set.

The operation mode setting unit 21 (operation mode storage unit) of the network control unit 2 sets whether to make the communication apparatus 1 operate in a publisher mode or a subscriber mode. Also, the operation mode setting unit 21 sets a multicast group to which the communication apparatus belongs. The setting of the multicast group will be described later. In the present embodiment, a subscriber can become a publisher, and a publisher can become a subscriber. The operation mode setting unit 21 manages processing for switching a subscriber to a publisher and for switching a publisher to a subscriber. An operation mode can be set for each multicast group, individually. For example, one communication apparatus 1 can be set to be a publisher in one multicast group and a subscriber in a different multicast group. The operation mode setting unit 21 controls the file management unit 22 and the message processor 23 to perform an operation corresponding to an operation mode of each multicast group.

When operating as a publisher, the file management unit 22 generates a Table of Contents (ToC) (content information) of a file group to be transmitted to a subscriber. The ToC includes an identifier of each file. Also, when a file is divided and transmitted, the ToC includes identification information of divided data which is included in the file. In the present embodiment, a group of data transmitted from a publisher to a subscriber is called a file. The file may be any kind of data file. For example, the file may be a text file, or an image or video image data file. The publisher transmits one or more files by a series of messages. Before the transmission of the series of messages, the file management unit 22 generates one or more ToC and generates an identifier (ID) of the holding ToC as ToC information (ToC Info) when operating as a publisher to generate the ToC which stores information related to a file corresponding to the series of messages. The message processor 23 generates a message (ToC message) in which the ToC information is stored as it is or by being compressed. For example, a Bloom filter of an ID in the ToC can be used as the ToC information. The wireless interface 4 notifies the ToC message as a wireless signal, for example, in a cycle.

When operating as a subscriber, the file management unit 22 holds a list of files notified by the ToC. Also, when a file is divided and transmitted, the file management unit 22 holds a list of identification information of divided data which is included in the file. The file management unit 22 compares the ToC and the file stored into the non-volatile memory 5, and determines whether all files described in the ToC are received. In the present embodiment, a state, in which all files described in the ToC are received, of the file management unit 22 is called Satisfied, and a subscriber which is received all files described in the ToC is called a Satisfied subscriber. When a state becomes Satisfied, the file management unit 22 notifies, to the operation mode setting unit 21, that the state is Satisfied.

The message processor 23 generates a message, in which data to be transmitted to different communication apparatus 1 is shaped to a certain format, and transmits the message to the wireless interface 4. Also, the wireless interface 4 receives a message received from different communication apparatus 1 and performs processing corresponding to contents of the message.

When operating as a publisher, the message processor 23 generates a data message which stores data (data included in file) held in the non-volatile memory 5. Note that here, an example in which a publisher transmits data held in the non-volatile memory 5 to a subscriber will be described. However, the present embodiment can also be applied to a case where data received through a wired or wireless line or data stored in a different external storage medium is transmitted.

When operating as a subscriber, the message processor 23 extracts data from a data message received from different communication apparatus 1 and stores the data into the non-volatile memory 5. When a ToC is received, the message processor 23 notifies, to the file management unit 22, a list of files stored in the ToC (or list of identification information of divided data which is included in file).

Figure 2:
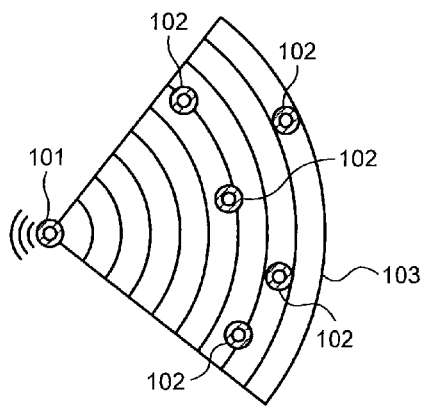
FIG. 2 is a view illustrating an example of message transmission of the embodiment.

FIG. 2 is a view illustrating an example of message transmission of the present embodiment. A publisher 101 transmitting a data message by multicast is illustrated. A subscriber 102, which is within a reachable range 103 of a radio wave from the publisher 101, can receive a data message. Note that a radio wave output from the publisher 101/subscriber 102 may or may not have directionality. In FIG. 2, when not having directionality, the radio wave output from the publisher 101/subscriber 102 propagates concentrically.

Figure 3:
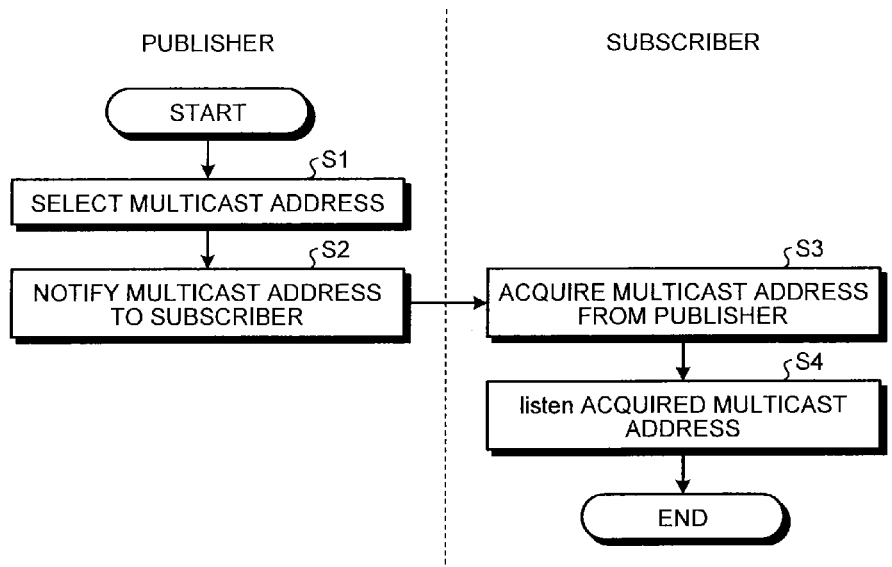
FIG. 3 is a view illustrating an example of a processing step for participating in a multicast group.

FIG. 3 is a view illustrating an example of a processing step for participating in a multicast group. When creating a new multicast group, a publisher selects a multicast address (step S1). The selection of the multicast address is performed by the multicast group storage unit 3. This multicast address is used as an identifier, which is for receiving a file transmitted by the publisher, of the multicast group. Next, the publisher notifies the multicast address to an apparatus therearound in some way (step S2). For example, a method of previously connecting all communication apparatuses 1, which can participate in the multicast group, to a network space having a common network address and notifying by broadcasting to the network can be considered. Alternatively, an administrator of the publisher may tell the multicast address to a user of the subscriber by a physical way, such as an oral communication, which does not depend on a network. Also, an operator may decide the multicast address instead of the publisher and may set the multicast address to the publisher. The operator may notify the multicast address to a user by a piece of paper, an email, or the like.

When the subscriber acquires the multicast address by an input from a user or by reception from the publisher (step S3), in a case where a file is received from a publisher in the multicast group, listen (reception of data transmitted in the multicast group) is started by setting the multicast address (step S4). Specifically, a multicast group storage unit 3 of the subscriber holds the multicast address. Also, a multicast group storage unit 3 of the publisher holds the determined or set multicast address.

The reception from the publisher being started by the participation of the subscriber in the multicast group in such a manner is called associate in the present embodiment. Also, the subscriber can stop receiving data from the publisher at an arbitrary time point. The subscriber stopping receiving data from the publisher at an arbitrary time point is called dissociate in the present embodiment.

When the communication apparatus 1 includes a plurality of wireless interfaces 4, one communication apparatus 1 may participate in a plurality of multicast groups simultaneously. In this case, a different multicast address is set to each wireless interface 4.

As described, the publisher transmits a data message. The publisher also transmits the following two kinds of notification messages other than the data message. One is a first notification signal which notifies an identifier or the like related to wireless communication of the publisher. The other is a ToC message described above. In the following, the ToC message is called a second notification signal.

Figure 4:
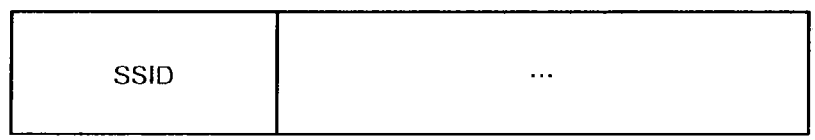
FIG. 4 is a view illustrating a configuration example of a first notification signal of the embodiment.

FIG. 4 is a view illustrating a configuration example of the first notification signal of the present embodiment. The first notification signal can be received regardless of whether the subscriber participates in the multicast group, and for example, as illustrated in FIG. 4, a service set identifier (SSID), which is an identifier related to wireless communication of the publisher, is stored therein. The first notification signal may include information other than the SSID. There is no restriction in a configuration of the first notification signal. For example, a beacon in a wireless local area network (LAN) may be used as the first notification signal.

Also, the SSID may include information related to the ToC message distributed by the publisher. For example, a Bloom filter of an ID in the ToC may be included as a part of the SSID.

Figure 5:
FIG. 5 is a view illustrating a configuration example of a second notification signal of the embodiment.

FIG. 5 is a view illustrating a configuration example of the second notification signal of the present embodiment. The second notification signal includes a transmission-source publisher identifier, a transmission-destination multicast group identifier, and ToC information (ToC Info). The second notification signal may include information other than the above.

Figure 6:
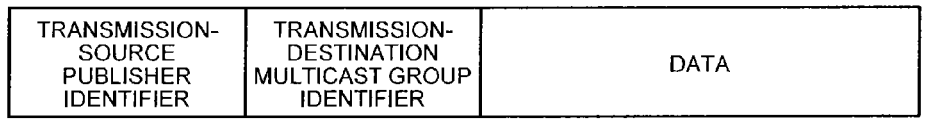
FIG. 6 is a view illustrating a configuration example of a data message.

FIG. 6 is a view illustrating a configuration example of a data message. As illustrated in FIG. 6, in the data message, a publisher identifier of a transmission source is stored as information indicating the transmission source and a multicast group identifier of a transmission destination is stored as information indicating the destination. Subsequently, data (data included in file) which is transmitted with this data message is stored.

Figure 7:
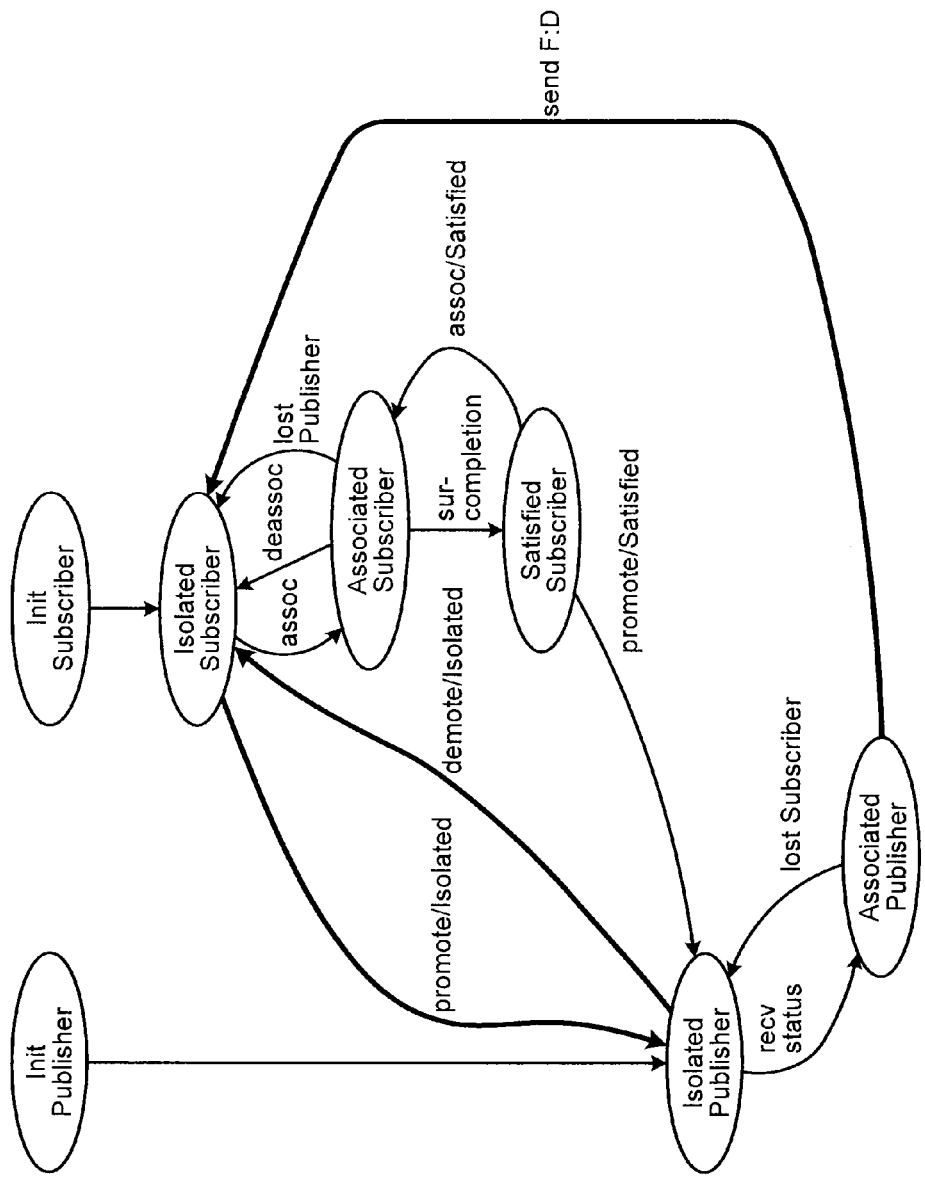
FIG. 7 is a view illustrating an example of state transition of the embodiment.

Next, state transition of the present embodiment will be described. FIG. 7 is a view illustrating an example of state transition of the present embodiment. In an initial state, the communication apparatus 1 of the present embodiment is set as a publisher or a subscriber for each multicast group.

For example, in the initial state, one or more publishers are set in a multicast group. A subscriber, which receives all data distributed by the publisher, has information equivalent to that of the publisher. Thus, such a subscriber can operate as a publisher. When such a subscriber is operated as a publisher, it is possible to enlarge a range in which data can be distributed. On the other hand, when there is a plurality of publishers, which distributes the same data, in the vicinity, radio waves get congested and data is not distributed effectively. In the present embodiment, by making it possible to promote a subscriber to a publisher and by setting restriction for the promotion, congestion of radio waves is prevented and data is distributed effectively.

Here, words used in the present embodiment will be described. As described, the communication apparatus 1 of the present embodiment can operate as a publisher or as a subscriber. As a state of the communication apparatus 1 operating as a publisher, three states, that is, an Init publisher, an Associated publisher, and an Isolated publisher will be defined. The Init publisher is a state in which the communication apparatus 1 is set as a publisher in an initial state. The communication apparatus 1 in the Init publisher state automatically transitions into the Isolated publisher. The Isolated publisher is a state in which there is no subscriber to receive data transmitted by the communication apparatus 1 operating as a publisher. A publisher in the Isolated publisher state periodically transmits a first notification signal and also a second notification signal. As described later, when receiving data from an Associated publisher, a subscriber periodically transmits a status signal to the publisher, for example. The Isolated publisher may or may not transmit a file. In the following, the communication apparatus 1 in each of the states will be arbitrarily omitted and described with the name of the state. For example, a communication apparatus 1 in the Isolated publisher state will be arbitrarily called an Isolated publisher.

By receiving a status signal from a subscriber, the Isolated publisher transitions into the Associated publisher. The Associated publisher periodically transmits a first notification signal, and periodically transmits a second notification signal, to transmit a file. When a status signal is not received for equal to or more than a certain period of time (lost subscriber), the Associated publisher determines whether there is a different publisher. When there is no different publisher, the Associated publisher transitions into the Isolated publisher. It is determined whether there is a different publisher, for example, by whether a second notification signal from the different publisher is received within a certain period of time.

As a state of the communication apparatus 1 operating as a subscriber, four states, that is, an Init subscriber, an Associated subscriber, an Isolated subscriber, and a Satisfied subscriber will be defined. The Init subscriber is a state in which the communication apparatus 1 is set as a subscriber in an initial state. The Init subscriber automatically transitions into the Isolated subscriber. The Isolated subscriber is a state in which data is not received from a publisher. Detail of an operation of the Isolated subscriber will be described later. A subscriber in the Isolated subscriber state receives a second notification signal and transitions into the Associated subscriber by receiving data from a publisher of a transmission source of the second notification signal (participating in multicast group corresponding to multicast identifier stored in second notification signal). The Associated subscriber receives data from a publisher and stores the received data into the non-volatile memory 5. Also, the Associated subscriber transmits a status signal to the publisher periodically, for example.

The Associated subscriber can stop (disassociate) receiving data from the publisher at an arbitrary time point. By disassociating, the Associated subscriber transitions into the Isolated subscriber. Also, when a signal is not received from the publisher for equal to or more than a certain period of time, the Associated subscriber determines that no publisher exists therearound, that is, a state of the lost publisher, and transitions into the Isolated subscriber.

Also, as described above, the Associated subscriber holds a ToC list and determines whether all files included in the ToC list are received and stored into the non-volatile memory 5 (all-satisfied). The Satisfied subscriber is the all-satisfied (sur-completion) state. When being all-satisfied, the Associated subscriber transitions into the Satisfied subscriber.

The Satisfied subscriber determines whether it is possible to receive a second notification signal of a publisher other than the publisher the reception from which is completed. It is assumed that a second notification signal from a publisher other than a first publisher, the reception from which is completed, is received. In this case, when it is determined that the Satisfied subscriber does not have a file transmitted by a second publisher based on ToC information stored in the second notification signal, the Satisfied subscriber can stop receiving a file from the first publisher and can start receiving data from the second publisher (associate/satisfied). Detail of an operation of the Satisfied subscriber will be described later.

The state transition of the subscriber and the state transition of the publisher are described. As illustrated by a heavy line in FIG. 7, in the present embodiment, it is also possible for a subscriber to transition into a publisher and for a publisher to transition into a subscriber. In the present embodiment, transition from a subscriber into a publisher is called promotion, and transition from a publisher into a subscriber is called demotion.

As the promotion, two examples, which are promotion from the Satisfied subscriber and promotion from the Isolated subscriber, can be considered. A publisher can be demoted at arbitrary timing and become the Isolated subscriber. For example, the publisher can be demoted in a case where it is difficult to keep transmitting data, such as a case where battery capacity of the communication apparatus 1 is small. When the Associated publisher is demoted, the demotion is notified. For example, a region to store a flag for notifying the demotion may be provided to a second notification signal, and the Associated publisher may set this flag to demotion (D) and transmit the second notification signal to perform the notification. When the Isolated publisher is demoted, there is no subscriber receiving data, and thus, it is not necessary to notify the demotion. However, the demotion may be notified.

Figure 8:
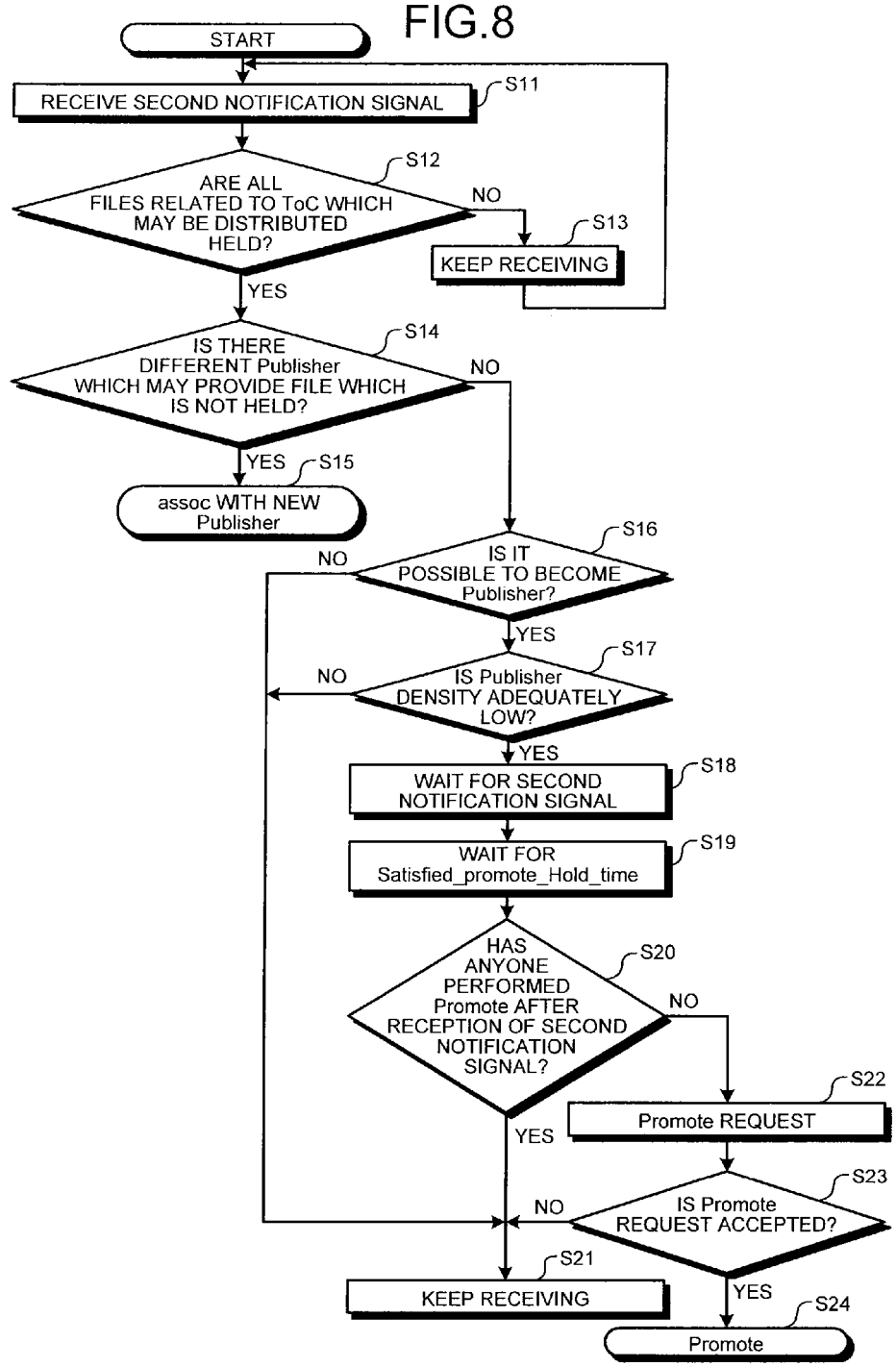
FIG. 8 is a flowchart illustrating an example of a processing step according to promotion from a Satisfied subscriber.

Next, the promotion will be described in detail. An example of promotion from the Satisfied subscriber will be described. FIG. 8 is a flowchart illustrating an example of a processing step according to the promotion from the Satisfied subscriber. First, in the state of a subscriber (associate), the communication apparatus 1 receives a second notification signal from a publisher (step S11). Also, the subscriber (associate) receives data (data included in file) from a publisher (hereinafter, referred to as publisher in connection).

The file management unit 22 of the communication apparatus 1 determines whether all files corresponding to a ToC, which may be distributed by a publisher, are held based on ToC information notified by the second notification signal (step S12). Specifically, it is determined whether files distributed by the publisher are already received and all of the files are stored into the non-volatile memory 5. In a case where at least a part of the files corresponding to the ToC, which may be distributed by the publisher, is not received yet (step S12 No), it is determined to keep receiving data (step S13) and a step goes back to step S11.

In a case where all files corresponding to the ToC, which may be distributed from the publisher, are held (step S12 Yes), the transition into the Satisfied subscriber is performed and it is determined whether there is a publisher other than the publisher in connection (different publisher), which may provide a file which is not held (step S14). Specifically, the message processor 23 notifies, to the file management unit 22, the ToC information stored in the second notification signal. The file management unit 22 determines whether all files corresponding to the ToC information are already received based on the ToC information notified by the message processor 23 and notifies a result of the determination to the operation mode setting unit 21.

When there is a publisher which may provide a file which is not held (step S14 Yes), the communication apparatus 1 associates with the publisher (new publisher) and starts receiving data (step S15). Specifically, the operation mode setting unit 21 stores a multicast address of the publisher (new publisher) into the multicast group storage unit 3. That is, in this case, due to associate/satisfied, the Satisfied subscriber transitions into a subscriber (associate) which is connected with a different publisher.

When there is not a publisher which may provide a file which is not held (step S14 No), the operation mode setting unit 21 determines whether it is possible to become a publisher (step S16). As a criterion, for example, in a case where received signal strength (such as received signal strength indicator (RSSI)) of a signal transmitted from a publisher is lower (received signal strength is weaker) than a threshold (Assoc_RSSI_Threshold), it is determined that it is possible to become a publisher. This is to prevent a subscriber in the vicinity of an existing publisher from becoming a publisher. Note that other than the received signal strength, for example, a different element such as whether battery capacity is adequate may be considered. When it is determined that it is possible to become a publisher (step S16 Yes), the communication apparatus 1 determines whether publisher density is adequately low (step S17). Specifically, it is determined whether the publisher density is adequately low in the following manner, for example. The operation mode setting unit 21 instructs the Publisher scan unit 24 to scan a publisher. The Publisher scan unit 24 recognizes the number of publishers therearound based on the first notification signal received from the publisher and notifies the number to the operation mode setting unit 21. Specifically, the number of publishers, first notification signals of which are received, is calculated based on the SSID stored in the received first notification signal. When the number of publishers, first notification signals of which are received, is equal to or less than a certain number, the operation mode setting unit 21 determines that the publisher density is adequately low.

When it is determined that the publisher density is adequately low (step S17 Yes), the operation mode setting unit 21 of the communication apparatus 1 waits for the second notification signal being received (step S18). Then, the operation mode setting unit 21 waits for Satisfied_promote_Hold_time, which is random time determined for each communication apparatus 1 based on a predetermined rule, after the second notification signal is received (step S19). When the Satisfied_promote_Hold_time passes after the reception of the second notification signal, the operation mode setting unit 21 determines whether a promote request is received from different communication apparatus 1 after the second notification signal is received (step S20). The promote request is a message to request promotion from a subscriber to a publisher and is transmitted from the subscriber to multicast.

When a promote request is received from a different communication apparatus 1 (step S20 Yes), the Satisfied subscriber state is maintained and reception from a publisher is continued (step S21). After this, the communication apparatus 1 can perform an arbitrary operation as long as an operation as a subscriber is continued. For example, step S4 may be performed again, or due to movement of the communication apparatus 1 or a publisher in connection with the communication apparatus 1, the communication apparatus 1 may become off from a reachable range of radio waves from the publisher in connection and may become the Isolated subscriber.

When a promote request is not received from a different communication apparatus 1 (step S20 No), the operation mode setting unit 21 of the communication apparatus 1 transmits a promote request, which is to request promotion to a publisher, by multicast through the message processor 23 and the wireless interface 4 (step S22). Then, it is determined whether the promote request is accepted (step S23), and when the promote request is accepted (step S23 Yes), the promote is performed (step S24). After the promote, an operation as the Isolated publisher is performed first. It is determined whether the promote request is accepted based on whether a response signal indicating that the promote request is accepted is received from the publisher in connection.

When it is determined that the promote request is not accepted (step S23 No), a step goes to step S21. Also, when it is determined that it is not possible to become a publisher in step S16 (step S16 No), a step goes to step S21. Also, when it is determined that the publisher density is not adequately low in step S17 (step S17 No), a step goes to step S21.

Figure 9:
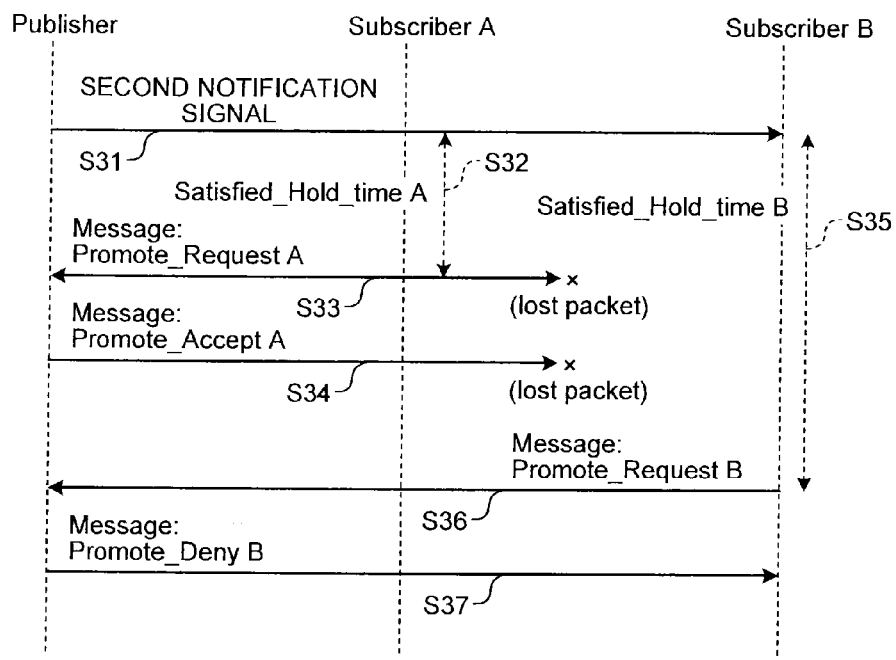
FIG. 9 is a chart illustrating an example of a promote request processing step.

FIG. 9 is a chart illustrating an example of a promote request processing step. It is assumed that a subscriber A and a subscriber B become the Satisfied subscribers and wait for the second notification signal based on the determination that the publisher density is adequately low, the determination being made according to the processing from the start to step S17 in FIG. 8. In such a state, each of the subscriber A and the subscriber B receives the second notification signal from the publisher (step S31).

After receiving the second notification signal, the subscriber A waits for Satisfied_promote_Hold_time (Satisfied_Hold_time A) calculated based on a predetermined rule (step S32), and transmits a promote request by the multicast after the wait (step S33). In an example in FIG. 9, it is assumed that the publisher can receive this promote request and the subscriber B fails to receive the promote request. When receiving the promote request from the subscriber A, the publisher transmits a response message indicating that the promote request is accepted (step S34). It is assumed that the subscriber A can receive this response message and the subscriber B fails to receive the response message. Then, by receiving the response message from the publisher, the subscriber A recognizes that the promote request is accepted, and thus, the subscriber A is promoted to a publisher.

On the other hand, after receiving the second notification signal, the subscriber B wait for Satisfied_promote_Hold_time (Satisfied_Hold_time B) calculated based on a predetermined rule (step S35), and transmits a promote request by the multicast after the wait (step S36). When receiving a promote request from a different communication apparatus 1 within a certain period of time after a promote request is received and accepted, the publisher does not accept this promote request. At a time point at which the promote request transmitted in step S36 in FIG. 9 is received, the publisher accepts the promote request from the subscriber A. Thus, the publisher does not accept the promote request from the subscriber B and transmits a response message which denies the promote request (step S37).

When a great number of subscribers are promoted to publishers simultaneously, radio waves get congested. Thus, when a subscriber is promoted to a publisher, it is preferable to set some restriction. In the present embodiment, as the restriction, a several conditions are considered. First, as illustrated in step S17 in FIG. 8, a first condition is publisher density being low.

As a second condition, as illustrated in step S19 and step S20 in FIG. 8, a subscriber wait for random time (Satisfied_promote_Hold_time) calculated based on a predetermined rule and is promoted to a publisher when a promote request is not received from a different subscriber during the wait. That is, when a promote request is received from a different subscriber, promotion to a publisher is stopped. In this case, a subscriber given priority for the promotion depends on a calculation method of the Satisfied_promote_Hold_time. For example, a method for calculation based on received signal strength (such as RSSI) of a signal transmitted from a publisher is considered, the received signal strength being calculated by each subscriber. When the calculation method of the Satisfied_promote_Hold_time is set in such a manner that the Satisfied_promote_Hold_time becomes longer as the received signal strength becomes higher, a subscriber with lower received signal strength (that is, far from publisher) is given priority to become a publisher.

In an example in FIG. 8, both of the first condition and the second condition are set as the restriction, but only one thereof may be used as the restriction. Thus, congestion of the radio waves can be prevented. Moreover, when a condition, in which promotion is performed when being accepted by a publisher, is added, a great number of subscribers are prevented from being promoted to the publishers even in a case where it is failed to receive a promote request from a different subscriber as illustrated in FIG. 9. The condition, in which promotion is performed when being accepted by the publisher, is not an essential. Only one or more of the first condition and the second condition may be used as the restriction. When the condition, in which promotion is performed when being accepted by the publisher, is not added, each subscriber is promoted to a publisher after transmitting a promote request. Then, according to the second condition, when a promote request from a different subscriber is received during the wait for the Satisfied_promote_Hold_time, a promote request is not transmitted.

Note that after transmitting the promote request, the subscriber may retransmit the promote request in a case where a promote request is not received from a different communication apparatus 1 and a response of Deny is not received from the publisher. Also, after transmitting the acceptation to a promote request and when receiving a promote request from a subscriber, which is different from the subscriber a promote request of which is accepted, the publisher may accept this promote request depending on a status of the wireless. A promote request from a subscriber, which is different from the subscriber a promote request of which is accepted, may be accepted, for example, when a status of the wireless is not congested much.

Next, promotion from the Isolated subscriber will be described. A subscriber (associate) may transition into the Isolated subscriber at an arbitrary time point due to movement or the like. FIG. 10 is a flowchart illustrating an example of a processing step of the Isolated subscriber. The operation mode setting unit 21 of the Isolated subscriber determines whether it is in the Isolated state for a certain period of time (step S41). When the Isolated state is less than the certain period of time (step S41 No), the status quo is maintained (step S42).

When being in the Isolated state for the certain period of time (step S41 Yes), the Isolated subscriber searches for a nearby publisher (step S43). Specifically, the operation mode setting unit 21 instructs the Publisher scan unit 24 to search for a publisher. Based on a first notification signal received from a publisher, the Publisher scan unit 24 calculates received signal strength of the received first notification signal for each publisher. Note that here, it is assumed that a transmission source of the first notification signal is a publisher.

The operation mode setting unit 21 determines whether there is a publisher the received signal strength of which is over a threshold (Assoc_RSSI_Threshold) (step S44). Here, the publisher the received signal strength of which is over the threshold is defined as a nearby publisher. When there is a publisher the received signal strength of which is over the threshold (Assoc_RSSI_Threshold) (step S44 Yes), association to one of the publishers the received signal strength of which is over the threshold (Assoc_RSSI_Threshold) is performed (step S45). Thus, the Isolated subscriber transitions into the subscriber (associate).

Based on a second notification signal received from an associated publisher, the file management unit 22 of the subscriber (associate) determines whether the publisher may distribute a ToC which the subscriber (associate) does not have (step S46). When it is determined that the publisher may distribute the ToC which the subscriber (associate) does not have (step S46 Yes), the subscriber (associate) stays as it is and continues the reception (step S47).

When it is determined that the publisher may not distribute the ToC which the subscriber (associate) does not have (step S46 No), the operation mode setting unit 21 disassociates from the publisher. Thus, the subscriber (associate) transitions into the Isolated subscriber. Then, after the transition into the Isolated subscriber, it is determined whether there is a different nearby publisher which is not associated with yet (step S48). When it is determined that there is a different nearby publisher which is not associated with yet (step S48 Yes), a step goes back to step S45, and association with the publisher which is not associated with yet is performed.

When it is determined that there is not a different nearby publisher which is not associated with yet (step S48 No), the file management unit 22 determines whether the subscriber (associate) has a ToC which all of the nearby publishers do not distribute (step S49 Yes). When the subscriber (associate) has the ToC which all of the nearby publishers do not distribute (step S49), the operation mode setting unit 21 of the subscriber (associate) determines whether it can become a publisher (step S50). Here, the determination whether the subscriber (associate) can become a publisher is performed based on, for example, battery capacity. When it is determined that the subscriber (associate) can become a publisher (step S50 Yes), promotion to a publisher is performed (step S51).

When it is determined that the subscriber (associate) cannot become a publisher (step S50 No), a step goes to step S42. When it is determined that the subscriber (associate) does not have the ToC which all of the nearby publishers do not distribute (step S49 No), a step goes to step S42. Also, in step S44, when it is determined that there is not a publisher the received signal strength of which is over the threshold (Assoc_RSSI_Threshold) (step S44 No), a step goes to step S50.

Note that here, the threshold used in step S44 in FIG. 10 and the threshold used for the determination in step S16 in FIG. 8 are the same, but values thereof may be different from each other.

Next, the operation of the Isolated publisher will be described. The operation mode setting unit 21 of the Isolated publisher instructs the Publisher scan unit 24 to search for a nearby publisher periodically, for example. When there is a different nearby publisher based on a result of the search by the Publisher scan unit 24, the operation mode setting unit 21 once performs demotion to a subscriber and transition into the Isolated subscriber. Then, association with the different nearby publisher may be performed to be a subscriber (associate). Also, it is determined that there is not a different nearby publisher based on the result of the search by the Publisher scan unit 24, the Isolated publisher may stay as it is or may be demoted to the Isolated subscriber.

As described above, in the present embodiment, a subscriber is promoted to a publisher when the subscriber already receives all data corresponding to ToC information and when at least one of a first condition, in which publisher density is low, and a second condition, in which a wait for random time calculated based on a predetermined rule is performed, is satisfied. Thus, congestion of radio waves can be prevented and data can be distributed effectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A communication apparatus comprising:
a wireless interface unit configured to transmit and receive a message with outside of the communication apparatus;
an operation mode storage unit configured to store whether a mode of the communication apparatus is a mode to operate as a publisher or a mode to operate as a subscriber;
an identification information storage unit configured to store a first identifier indicating that the communication apparatus belongs to a first group;
a message processor configured to generate a message to be transmitted by the wireless interface unit and to perform analysis of a message received by the wireless interface unit; and
a non-volatile memory,
wherein when the communication apparatus is a publisher based on the mode stored in the operation mode storage unit, the communication apparatus outputs a transmission message from the wireless interface unit to outside of the communication apparatus, the transmission message including ToC information, ToC including the first identifiers and a list of data to be transmitted, and
when the communication apparatus is a subscriber based on the mode stored in the operation mode storage unit, the communication apparatus determines whether a message received by the wireless interface unit includes the first identifier, data included in the message being stored into the non-volatile memory when the first identifier being included in the message, and the message not being stored into the non-volatile memory when the first identifier not being included in the message, and wherein when the communication apparatus operating as subscriber determines that all data corresponding to the ToC information stored in the message are already received and that calculates a number of publishers based on a service set identifier included in a notification signal from apparatus in the outside of the communication apparatus and the calculated number of publishers is less than a threshold, the mode stored in the operation mode storage unit is changed to the publisher so that the communication apparatus operates as a publisher.

2. The communication apparatus according to claim 1, wherein when the communication apparatus is a subscriber based on the mode stored in the operation mode storage unit and in a case where the communication apparatus determines that all data corresponding to the ToC information stored in the received message are already received and that the number of publishers in the outside of the communication apparatus is less than the threshold, a wait is performed for standby time calculated for each apparatus and a promote request to request promotion to a publisher is transmitted and the mode stored in the operation mode storage unit is changed to the publisher when a promote request to request promotion to a publisher is not received from the outside of the communication apparatus during the wait for the standby time.

3. The communication apparatus according to claim 2, wherein when the communication apparatus is a subscriber based on the mode stored in the operation mode storage unit and in a case where an accept response indicating that the promote request transmitted by the communication apparatus is accepted is received, the mode stored in the operation mode storage unit is changed to a publisher, and when the communication apparatus is a publisher based on the mode stored in the operation mode storage unit and in a case where a promote request is received, an accept response indicating that the promote request is accepted is transmitted, and a Deny response indicating that a promote request is denied is transmitted when the promote request is received within a certain period of time after the transmission of the accept response.

4. The communication apparatus according to claim 1, wherein when the communication apparatus is a subscriber based on the mode stored in the operation mode storage unit and in a case where it is determined that all data corresponding to the ToC information stored in the received message are already received and that the number of publishers in the outside of the communication apparatus is less than the threshold, a promote request to request promotion to a publisher is transmitted, and the mode stored in the operation mode storage unit is changed to the publisher when an accept response indicating that the promote request is accepted is received from an apparatus operating as a publisher, and when the communication apparatus is a publisher based on the mode stored in the operation mode storage unit and in a case where a promote request is received, an accept response indicating that the promote request is accepted is transmitted, and a Deny response indicating that the promote request is denied is transmitted when a promote request is received within a certain period of time after the transmission of the accept response.

5. The communication apparatus according to claim 1, wherein when the communication apparatus is a subscriber based on the mode stored in the operation mode storage unit, received signal strength of each different apparatus is calculated based on the notification signal received from the different apparatus, and when a number of apparatuses the received signal strength of which is equal to or higher than a further threshold is equal to or less than a certain number, it is determined that the number of publishers in the outside of the communication apparatus is less than the threshold.

6. A communication apparatus comprising:
a wireless interface unit configured to transmit and receive a message outside of the communication apparatus;
an operation mode storage unit configured to store whether a mode of the communication apparatus is a mode to operate as a publisher or a mode to operate as a subscriber;
an identification information storage unit configured to store a first identifier indicating that the communication apparatus belongs to a first group;
a message processor configured to generate a message to be transmitted by the wireless interface unit and to perform analysis of a message received by the wireless interface unit; and
a non-volatile memory,
wherein when the communication apparatus is a publisher based on the mode stored in the operation mode storage unit, the communication apparatus outputs a transmission message from the wireless interface unit to the outside of the communication apparatus, the transmission message including ToC information, ToC including the first identifiers and a list of data to be transmitted, and
when the communication apparatus is a subscriber based on the mode stored in the operation mode storage unit, the communication apparatus determines whether a message received by the wireless interface unit includes the first identifier, data included in the message being stored into the non-volatile memory when the first identifier being included, and the message not being stored into the non-volatile memory when the first identifier not being included, and
wherein a wait is performed for standby time when it is determined that all data corresponding to the ToC information stored in the received message are already received, and a promote request to request promotion to a publisher is transmitted to the outside of the communication apparatus and the mode stored in the operation mode storage unit is changed to the publisher in a case where a promote request to request promotion to a publisher is not received from the outside of the communication apparatus during the wait for the standby time.

7. The communication apparatus according to claim 6, wherein the standby time is calculated based on received signal strength of a signal received from a different communication apparatus operating as a publisher.

8. The communication apparatus according to claim 6, wherein when the communication apparatus is a subscriber based on the mode stored in the operation mode storage unit and in a case where an accept response indicating that the promote request transmitted by the communication apparatus is accepted is received, the mode stored in the operation mode storage unit is changed to a publisher, and when the communication apparatus is a publisher based on the mode stored in the operation mode storage unit and in a case where a promote request is received, an accept response indicating that the promote request is accepted is transmitted, and a Deny response indicating that a promote request is denied is transmitted when the promote request is received within a certain period of time after the transmission of the accept response.

9. A communication method in a communication apparatus including a non-volatile memory, the method comprising:
storing whether a mode of the communication apparatus is a mode to operate as a publisher or a mode to operate as a subscriber;
storing a first identifier identifying that the communication apparatus belongs to a first group;
outputting, to outside of the communication apparatus, a transmission message including ToC, when the communication apparatus is a publisher based on the stored mode, ToC including the first identifiers and a list of data to be transmitted;
determining whether a received message includes the first identifier when the communication apparatus is a subscriber based on the stored mode, and storing data included in the message into the non-volatile memory when the first identifier is included and not storing the message into the non-volatile memory when the first identifier is not included; and
changing the mode stored in the operation mode storage unit to a publisher in order to cause the communication apparatus to operate as a publisher when it is determined that all data corresponding to the ToC information stored in the received message are already received and that calculates a number of publishers based on a service set identifier included in a notification signal from apparatus in the outside of the communication apparatus and the calculated number of publishers is less than a threshold.

10. The communication method according to claim 9, wherein when the communication apparatus is a subscriber based on the stored mode and in a case where it is determined that all data corresponding to the ToC information stored in the received message are already received and that the number of publishers in the outside of the communication apparatus is less than the threshold, a wait is performed for standby time calculated for each apparatus and a promote request to request promotion to a publisher is transmitted and the mode stored in the operation mode storage unit is changed to the publisher when a promote request to request promotion to a publisher is not received from the outside of the communication apparatus during the wait for the standby time.

11. The communication method according to claim 10, wherein when the communication apparatus is a subscriber based on the stored mode and in a case where an accept response indicating that the promote request transmitted by the communication apparatus is accepted is received, the mode stored in the operation mode storage unit is changed to a publisher, and
when the communication apparatus is a publisher based on the stored mode and in a case where a promote request is received, an accept response indicating that the promote request is accepted is transmitted, and a Deny response indicating that a promote request is denied is transmitted when the promote request is received within a certain period of time after the transmission of the accept response.

12. The communication method according to claim 9, wherein when the communication apparatus is a subscriber based on the stored mode and in a case where it is determined that all data corresponding to the ToC information stored in the received message are already received and that the number of publishers in the outside of the communication apparatus is less than the threshold, a promote request to request promotion to a publisher is transmitted, and the mode stored in the operation mode storage unit is changed to the publisher when an accept response indicating that the promote request is accepted is received from an apparatus operating as a publisher, and
when the communication apparatus is a publisher based on the stored mode and in a case where a promote request is received, an accept response indicating that the promote request is accepted is transmitted, and a Deny response indicating that a promote request is denied is transmitted when the promote request is received within a certain period of time after the transmission of the accept response.

13. The communication method according to claim 9, wherein when the communication apparatus is a subscriber based on the stored mode, received signal strength of each apparatus is calculated based on the notification signal received from the apparatuses, and when a number of apparatuses the received signal strength of which is equal to or higher than a further threshold is equal to or less than a certain number, it is determined that the number of publishers in the outside of the communication apparatus is less than the threshold.

* * * * *